Figure 1:
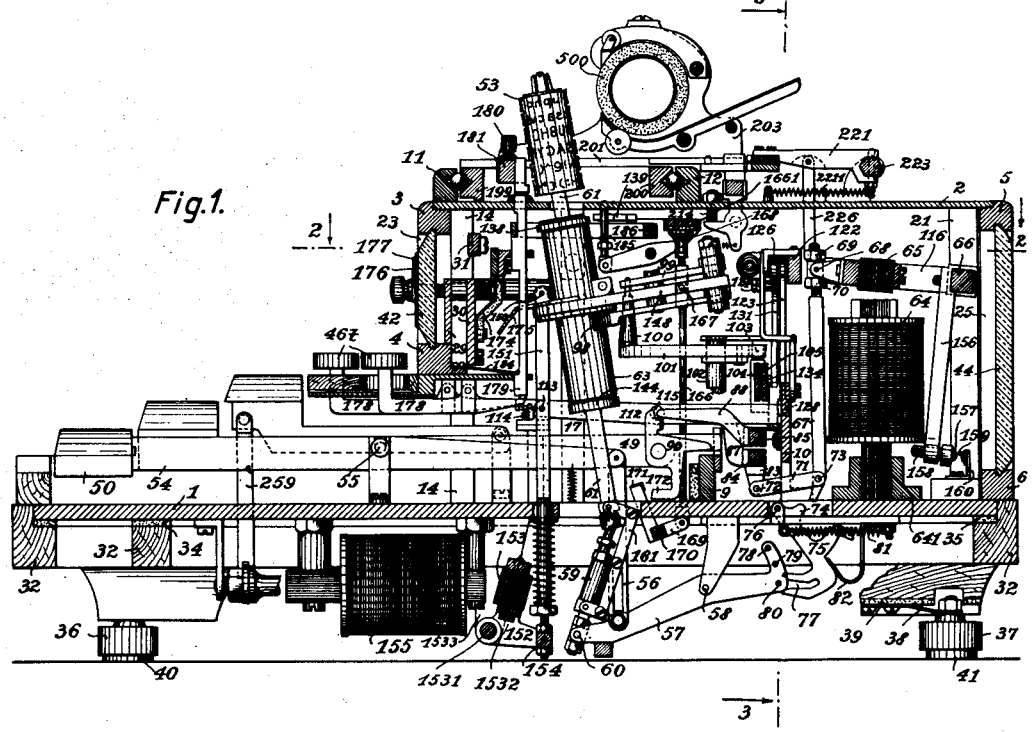

Sept. 15, 1925.

O. FISCHER 1,553,765

TYPEWRITING MACHINE

Filed Jan. 25, 1924 8 Sheets-Sheet 1

Inventor
Oskar Fischer
by Christy and Christy
Attorneys

Sept. 15, 1925.

O. FISCHER 1,553,765

TYPEWRITING MACHINE

Filed Jan. 25, 1924    8 Sheets-Sheet 2

Inventor
Oskar Fischer
by Christy and Christy
Attorneys

Sept. 15, 1925.
O. FISCHER
TYPEWRITING MACHINE
Filed Jan. 25, 1924
1,553,765
8 Sheets-Sheet 3
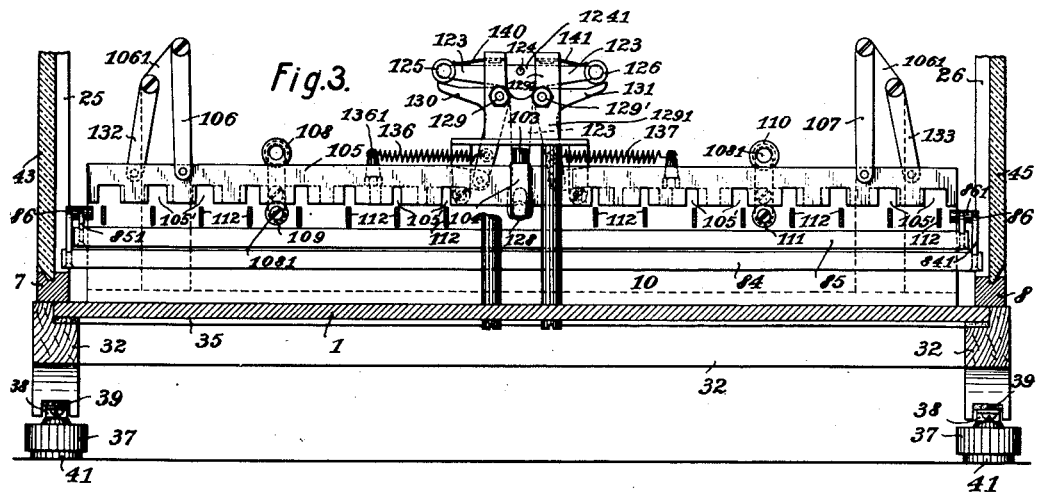
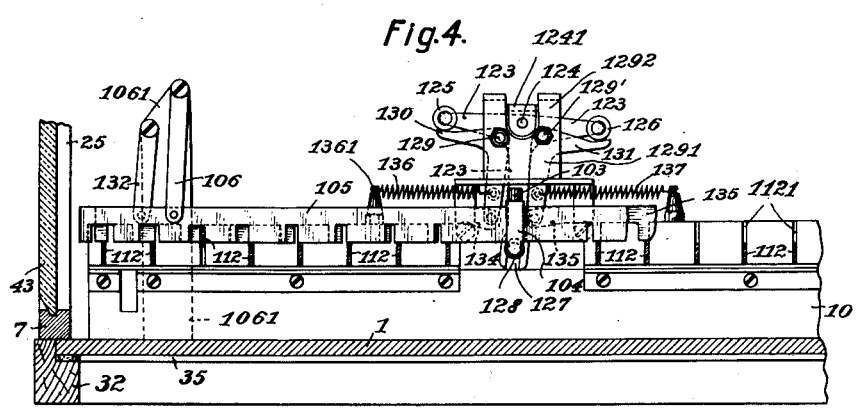
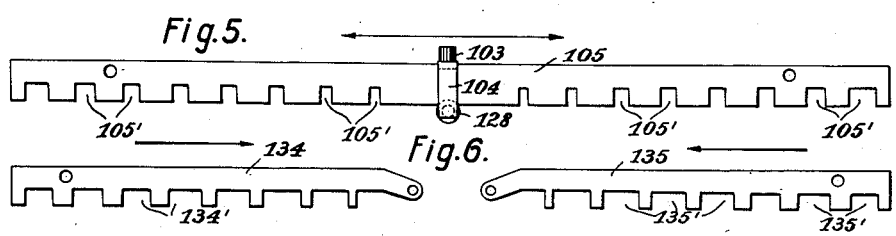
Inventor
Oskar Fischer
by Christy and Christy
Attorneys

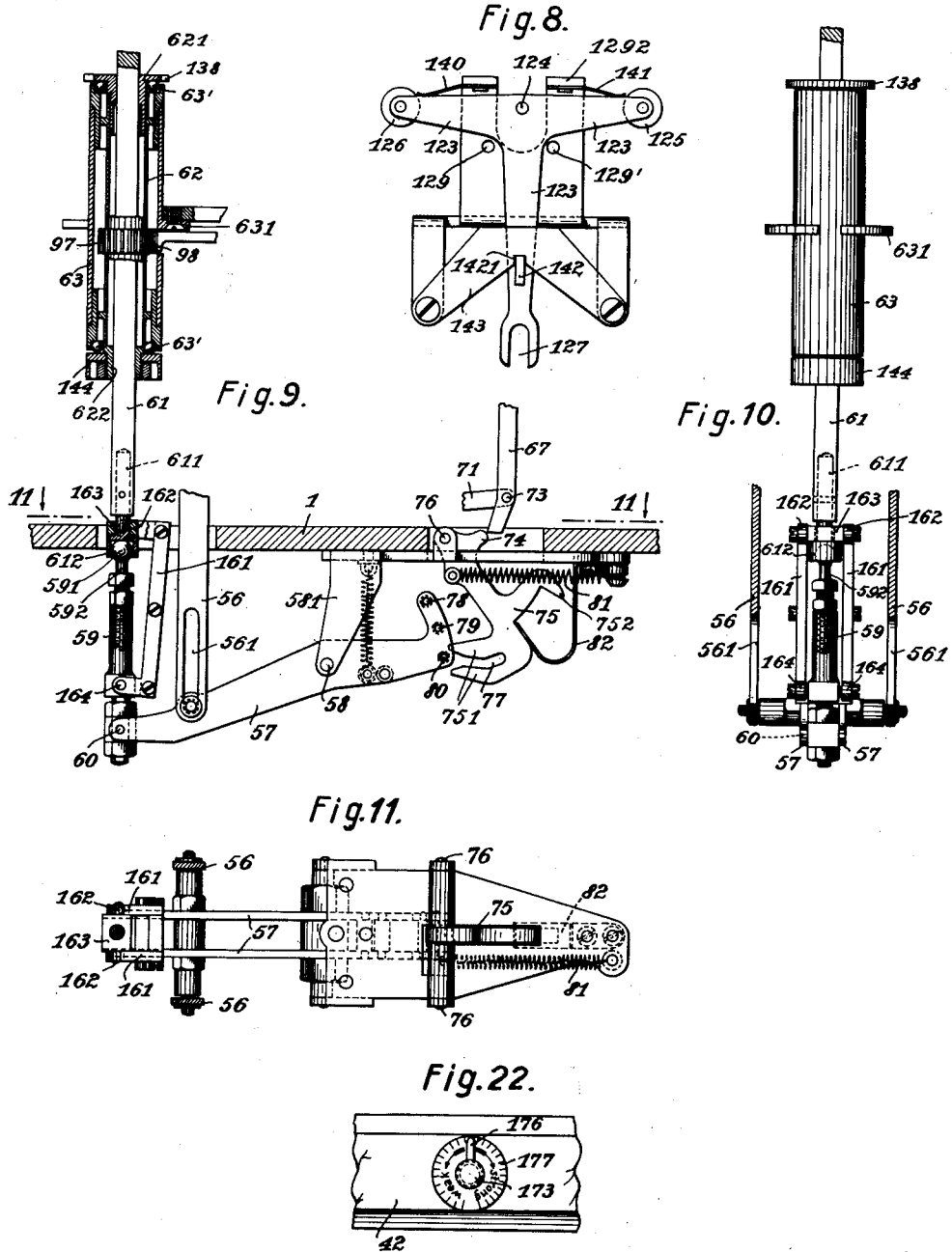

Sept. 15, 1925.

O. FISCHER

TYPEWRITING MACHINE

Filed Jan. 25, 1924

1,553,765

8 Sheets-Sheet 6

Inventor
Oskar Fischer
by Christy and Christy
Attorneys

Sept. 15, 1925.
O. FISCHER
1,553,765
TYPEWRITING MACHINE
Filed Jan. 25, 1924  8 Sheets-Sheet 7
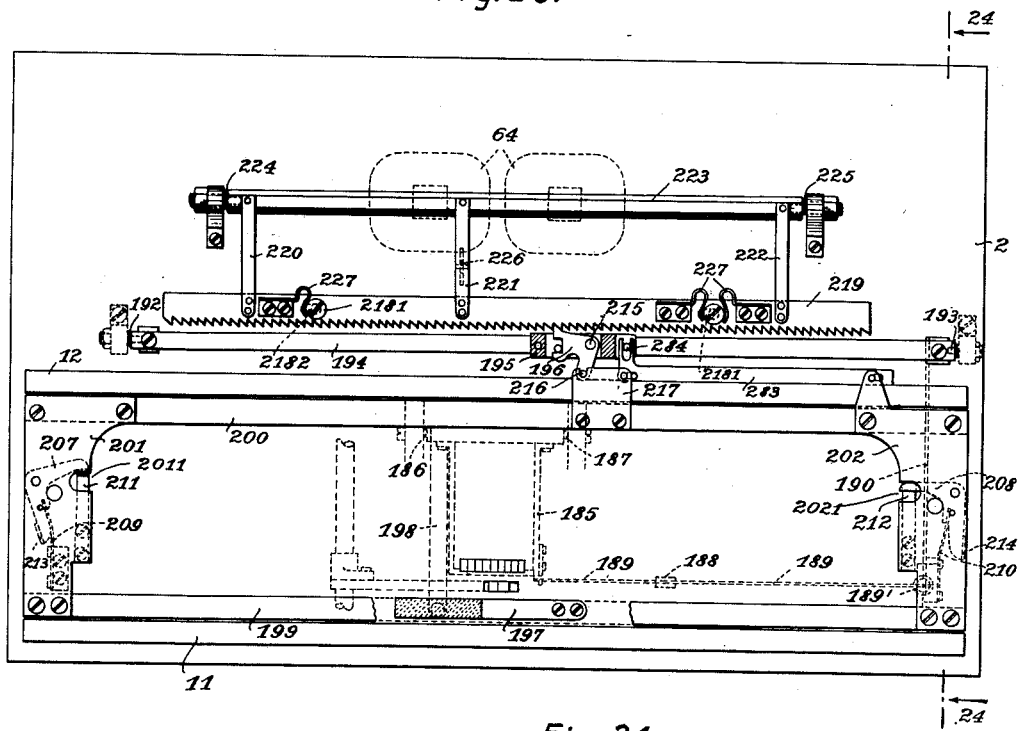
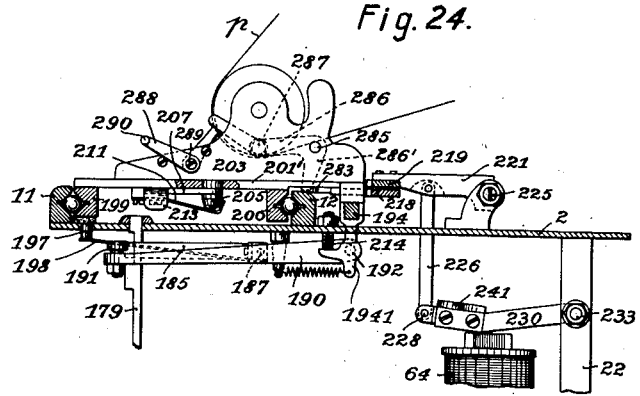
Inventor
Oskar Fischer
by Christy and Christy
Attorneys

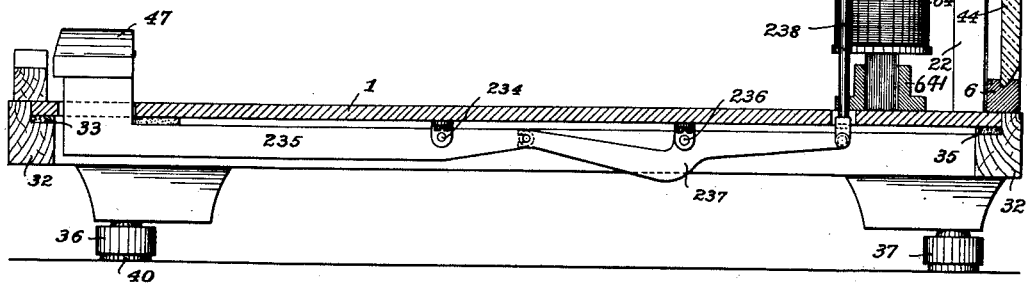
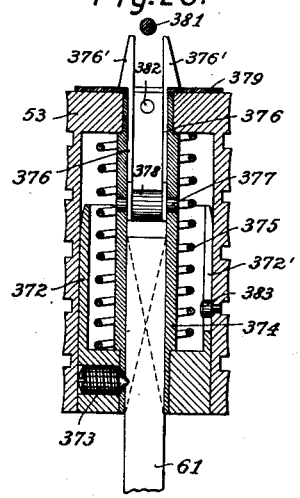
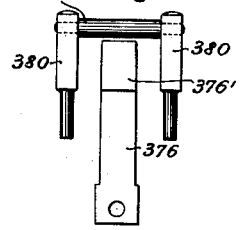
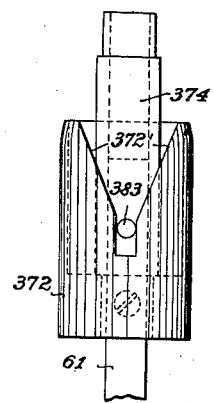
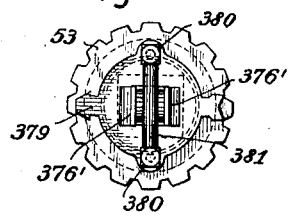

Patented Sept. 15, 1925.

1,553,765

UNITED STATES PATENT OFFICE.

OSKAR FISCHER, OF BERLIN-FRIEDENAU, GERMANY, ASSIGNOR TO N. V. MACHINA MAATSCHAPPIJ VOR HANDEL EN INDUSTRIE, OF AMSTERDAM, NETHERLANDS, A CORPORATION OF THE NETHERLANDS.

TYPEWRITING MACHINE.

Application filed January 25, 1924. Serial No. 688,399.

*To all whom it may concern:*

Be it known that I, OSKAR FISCHER, a citizen of Germany, residing at Berlin-Friedenau, in the State of Prussia, Germany, have invented certain new and useful Improvements in Typewriting Machines; and I do hereby declare the following to be a full, clear, and exact description of the invention, such as will enable others skilled in the art to which it appertains to make and use the same.

My invention relates to improvements in typewriting machines, and more particularly in typewriting machines of the class in which the types are disposed in several rows on a type wheel or cylinder adapted to be moved in axial and circumferential direction for setting any one of the types in printing position, and to be thrown against the platen for printing. The object of the improvements is to provide a machine which can be operated at high speed. With this object in view my invention consists in providing some of the type operating mechanisms with means for axially shifting the type cylinder a distance corresponding to that between two adjacent rows of types, so that the shifting movement is performed by the depression of said keys. In addition shift keys are provided for axially shifting the type cylinder, and both shifting means are constructed for additive operation.

In a preferred embodiment of the invention the type cylinder carries three sets each comprising two rows of types, the rows of the upper set representing the small letters, those of the median set the capitals, and those of the lower set the figures and the signs. Normally the upper row of the upper set is in printing position, and by depressing one or the other of the shift keys the upper row of the median set or the upper row of the lower set may be brought into printing position. When depressing a key corresponding to one of the types in an upper row no additional shifting movement is imparted to the type cylinder, and by depressing a key corresponding to one of the types in a lower row an additional shifting movement is imparted to the type cylinder for shifting the same a distance corresponding to the distance between the two rows of the set. The number of the type keys corresponds to the number of the types contained in one pair of rows, and each type key corresponds to three particular types, one within each pair of rows.

My invention also relates to means for imparting rotary movement to the type cylinder for setting the same with any one of the types of a given row in printing position, the object being to rotate the cylinder in one or the other direction by means of a member such as the armature of an electromagnet performing the same movement for rotating the type cylinder to the right or left. With this object in view I include two transmission mechanisms between the said member and the type cylinder, which mechanisms are adapted to transmit the movement of the member in opposite directions.

Other objects of the improvements will appear from the following description of my improved typewriting machine.

In describing the invention reference will be made to an electrical typewriting machine. But I wish it to be understood that my invention is not limited in all of its aspects to the use in a typewriting machine of this type.

Figure 18:
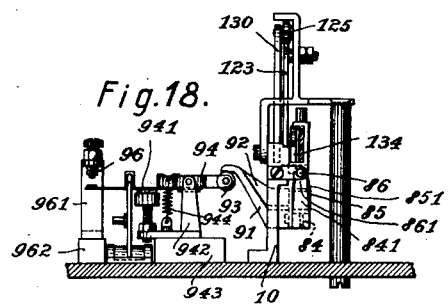
Figure 19:
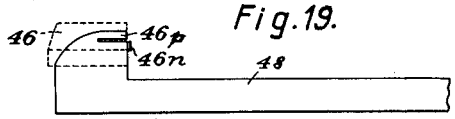
Figure 21:
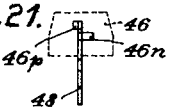
Figure 20:
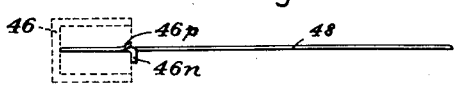
Figure 30:
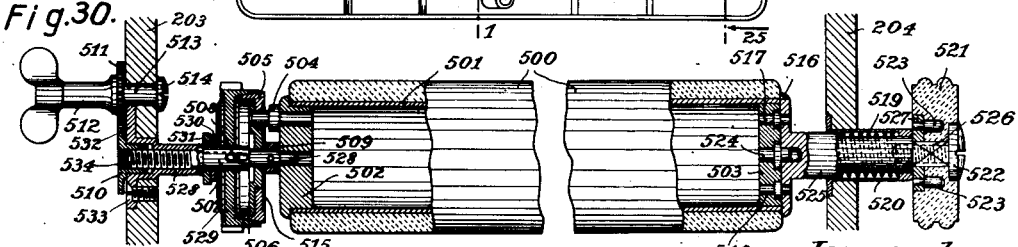
Figure 7:
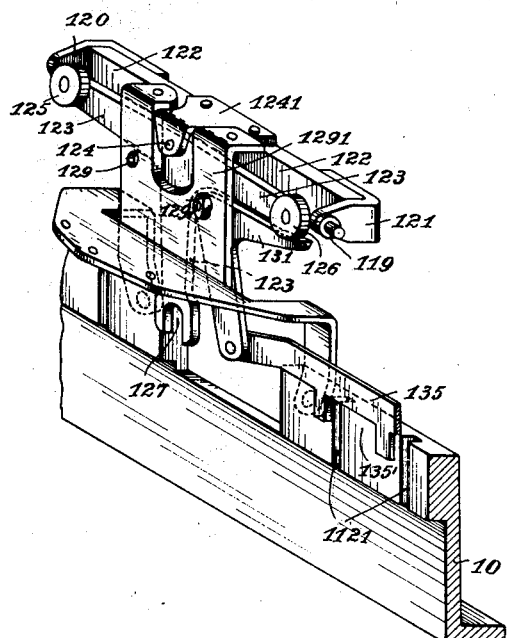
Figure 16:
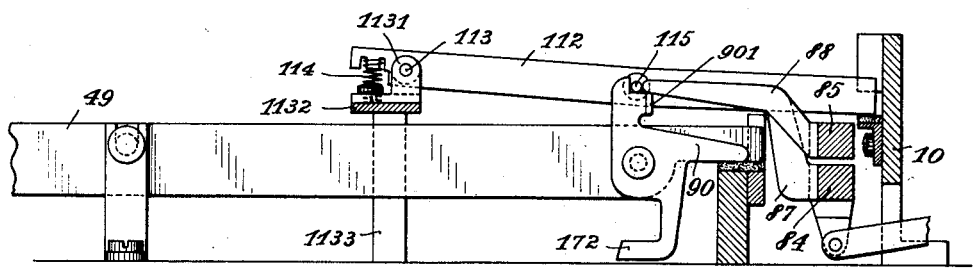
Figure 17:
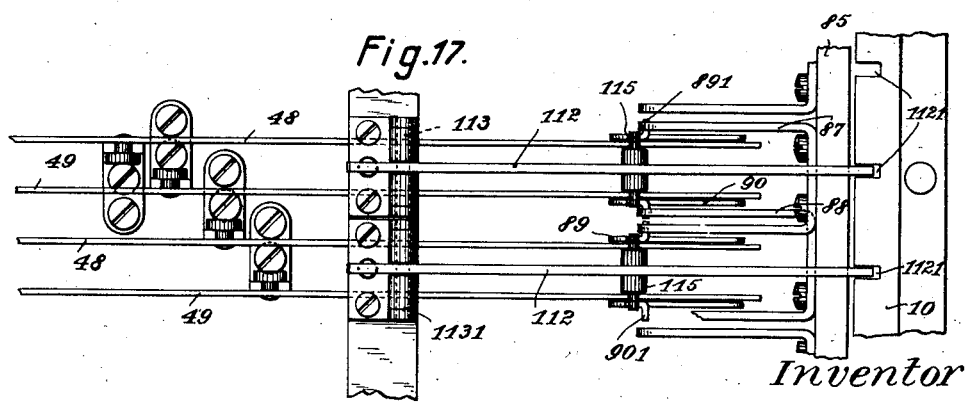
Figure 12:
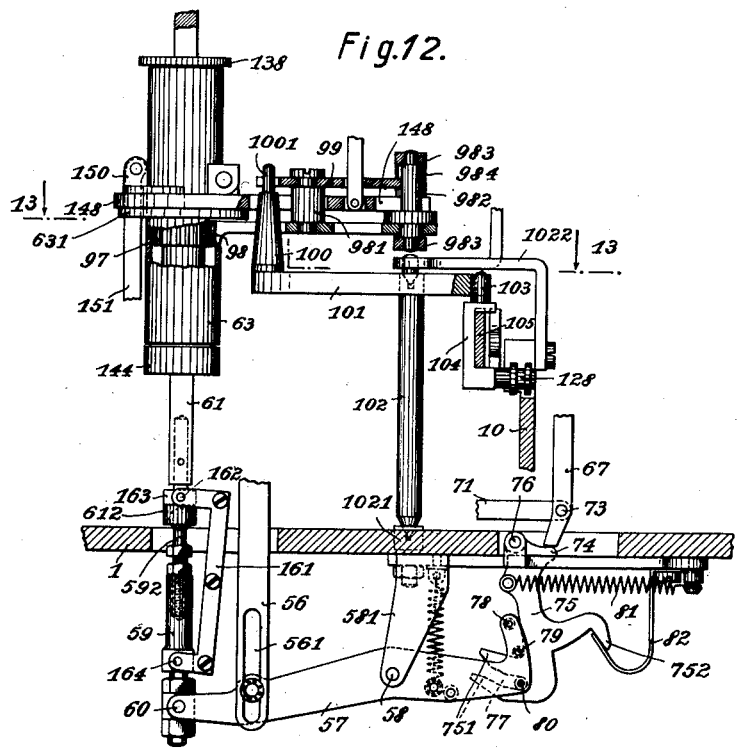
Figure 13:
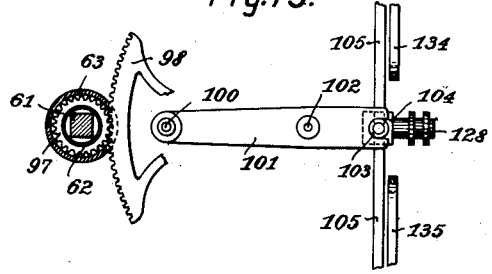
Figure 14:
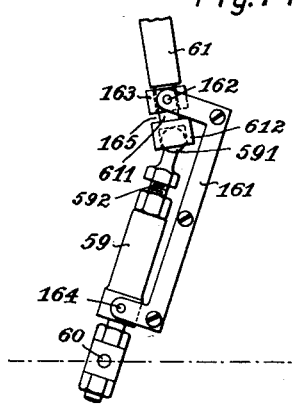
Figure 15:
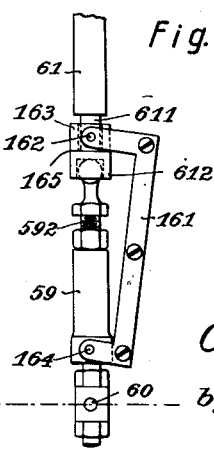

For the purpose of explaining the invention an example embodying the same has been shown in the accompanying drawings, in which the same reference characters have been used in all of the views to indicate corresponding parts. In said drawings, Fig. 1, is a vertical longitudinal section taken on the line 1—1 of Fig. 2, Fig. 2, is a sectional plan view of the machine taken on the line 2—2 of Fig. 1, Fig. 3, is a sectional elevation showing the mechanism for rotating the type cylinder and taken on the line 3—3 of Fig. 2, Fig. 4, is a similar elevation showing a part of a part the mechanism illustrated in Fig. 3 in a different position, Figs. 5 and 6, are detail views showing the bars forming a part of the type carrier operating mechanism, Fig. 7, is a perspective view showing a part of the mechanism for transmitting movement from the armature of the electromagnet to the bars shown in Figs. 5 and 6, Fig. 8, is an elevation showing a part of the mechanism illustrated in Fig. 7, Fig. 9, is an elevation partly in section showing the bearing of the spindle of the type carrier and the mechanism for shifting the type carrier in axial direction, Fig. 10, is an elevation looking from the left in Fig. 14, Fig. 11, is a sectional plan view of the shifting mechanism taken on the line 11—11 of Fig. 9 and with the base plate of the machine frame removed, Fig. 12, is an elevation partly in section illustrating the parts shown in Fig. 9 in different positions and showing in addition a part of the mechanism for rotating the type carrier, Fig. 13, is a plan view partly in section taken on the line 13—13 of Fig. 12, Figs. 14 and 15, are detail views showing the bottom part of the type carrier spindle and the stem supporting the same in different positions, Fig. 16, is a detail view showing the type key levers and the parts operated thereby, Fig. 17, is a plan view of Fig. 16, Fig. 18, is a detail view showing the circuit make and break device of the electromagnet provided for rotating and shifting the type carrier, Figs. 19 to 21, are detail views showing the method of removably securing the keys to the key levers, Fig. 19 being an elevation, Fig. 20 a plan view and Fig. 21 an end view, Fig. 22, is a detail view showing the screw for regulating the impact of the type carrier and the hand and graduated disk indicating the position of the screw, Fig. 23, is a plan view of the top plate of the machine frame showing the bottom part of the carriage and the letter spacing mechanism, Fig. 24, is a sectional elevation taken on the line 24—24 of Fig. 23 and showing in addition the top part of the carriage, Fig. 25, is a partial longitudinal section of the machine taken on the line 25—25 of Fig. 2 and showing the spacing mechanism, Fig. 26, is a vertical section of the type carrier, Fig. 27, shows a detail of Fig. 26, Fig. 28, is a top plan view of Fig. 26, Fig. 29, is an elevation of the sleeve supporting the type carrier with the type carrier and other parts removed and looking from the right in Fig. 26, and Fig. 30, is an elevation partly in section showing the platen.

Figure 2:
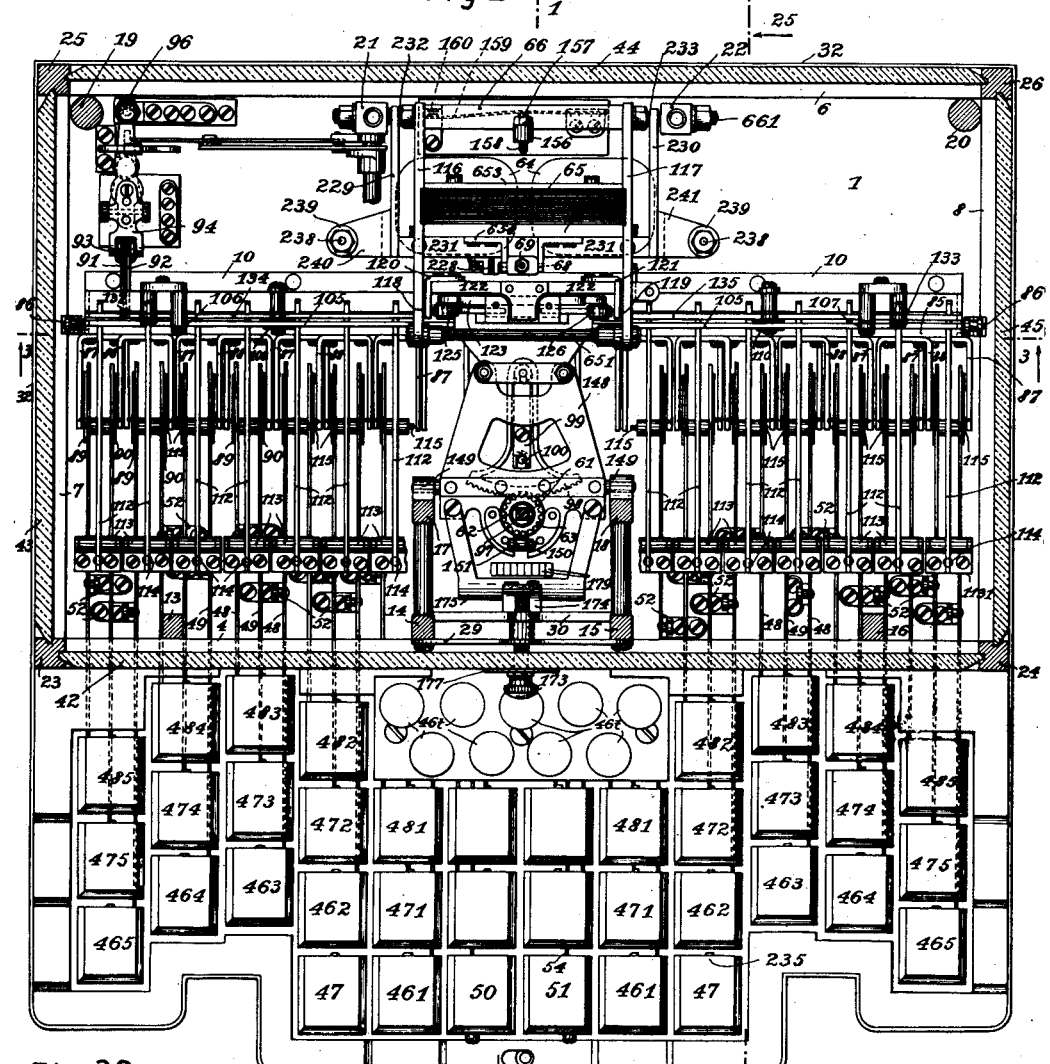

In the example shown in the drawings the frame of the typewriting machine consists of bottom and top plates 1 and 2 braced by bars 3, 5, 6, 7, 8, 9 and 10 and rails 11 and 12 and connected by pillars 13 to 22 in part of circular and in part of rectangular cross-section and side and end frame members 23 to 26 and 4, as is shown in Figs. 1 and 2. The frame is supported on a base frame 32, strips 34, 35 of felt or similar sound dampening material being interposed between the bottom plate 1 and the base frame 32. The frame 32 is supported on feet 36, 37 secured to the base frame through the intermediary of leaf springs 38, pieces 39 of felt or the like being interposed between the springs and the frame 32. The feet 36, 37 are provided with pieces 40, 41 of felt or rubber secured to the bottoms thereof. I have found that by thus mounting the frame of the machine on cushioning members the noise caused by the operation of the operative parts is reduced to a minimum.

The inner parts of the machine are protected as against injury and dust by plates 42 to 45 of glass fitted in the frame members 3, 4, 5, 6, 7 and 8.

The key board comprises type keys 46¹ to 46⁵, 47¹ to 47⁵, and 48¹ to 48⁵, spacing keys 47, shift keys 50 and 51, and tabulation keys 46ᵗ. The keys 46¹–46⁵, 47¹–47⁵, 48¹–48⁵, 47, 50 and 51 are removably secured to the key levers 48, 49, 235 and 54. As appears from Figs. 19 to 21 the keys are provided at their bottoms with slots by means of which they are fitted on the flat ends of the key levers. The front ends of the levers are formed with laterally projecting tongues 46ᵖ provided by indentations of the levers. At the rear of the keys the levers carry tongues 46ⁿ providing stops for the keys when pushing the same on the levers.

The relative arrangement of the keys is such as to facilitate blind writing and writing with all the fingers of each hand. For this purpose the type keys are disposed in several rows one behind the other, and the keys of each row are not disposed along straight lines but they are displaced with relation to each other according to the relative lengths of the fingers, so that in the normal or natural positions of the hands each finger directly bears on its key. The keys of the front or lowermost set are the following: the keys 46¹ designed for actuation by the thumbs of the right and left hands, the keys 46² for the forefingers, the keys 46³ for the middle fingers, the keys 46⁴ for the ring fingers, and the keys 46⁵ for the little fingers. The keys of the next sets are likewise disposed along curved lines, and the corresponding keys have received the characters 47¹, 47², 47³, 47⁴, 47⁵ and 48¹, 48², 48³, 48⁴, 48⁵, but the set of keys 47¹ to 47⁵ are elevated relatively to the keys 46¹ to 46⁵, and the keys 48¹ to 48⁵ are elevated relatively to the keys 47¹ to 475. The space keys 47 are disposed lower than the first set of keys 461 to 465. Therefore, when the fingers rest for example on the lower set of keys the thumbs feel the front faces of the keys 471 and the forefingers feel the sides of the said keys, which indicates that the fingers are in the correct positions. In the same way the ring fingers feel the side faces of the keys 475 of the next set. The space keys 47 and the shift keys 50 and 51 are so disposed as to permit operation without displacing the hands from the normal positions, by slightly moving the thumbs to the right or left.

By thus disposing the type keys a free field is left at the median rear part of the key board, which field is made use of for disposing the tabulation keys.

The type cylinder is mounted on a spindle 61 of square cross-section. In the example shown in the drawings the types are disposed on the type cylinder in six rows, the first and second rows containing the small letters, the third and fourth rows the capitals, and the fifth and sixth rows the figures and signs. Normally the first and second rows are in position for printing in response to type-key depression. The type cylinder is shifted axially, so as to bring either the third and fourth rows or the fifth and sixth rows to position for printing, by depressing one or the other of the two shift keys 50 and 51. In each pair of rows of types the proper row is automatically selected by the depression of the type key lever. The individual type within a given row which is to be effective is brought to printing position by rotation of the type cylinder through the proper range of turning, either to the right or to the left. The number of the type keys is equal to the number of the types in any row, and each type key corresponds to one type of each of the three pairs of rows. Finally, for printing, a throwing movement is necessary, by means of which the type cylinder having the proper type set in printing position is thrown against the platen. The movements are imparted to the type cylinder by the following mechanism:

(1) *Axial shifting of the type cylinder to bring alternate pairs of rows to printing position.*

In bearings 149 secured to the pillars 17 a plate 148 is rockingly mounted, and to the front end of the said plate a pair of eyes 150 are secured, as is best shown in Figs. 1, 2 and 12. The eyes 150 are connected by a link 151 with a bell crank lever 152 carrying the armature 153 of a throwing electromagnet 155, as will be described hereinafter.

To the front end of the plate 148 a cylinder 63 is secured by means of a flange 631, and in upper and lower anti-friction bearings 63' a sleeve 62 is rotatably mounted which is held in position within the cylinder by means of the flange of a ring 621 screwed or otherwise secured thereto and a ring 144 screwed to the hub 622 of the sleeve, said flange and ring bearing on the rolls of the antifriction bearings 63', as is shown in Fig. 9. The ring 621 and the hub 622 are formed with axial holes of square cross-section and within the said holes the square spindle 61 of the type cylinder is slidable. To the bottom end of the spindle a stem 611 is secured which is formed at its bottom end with an enlarged portion 612 having a socket, by means of which the spindle is supported on the spherical top end 591 of a rod 59 which is jointed at its bottom end to a pair of levers 57 having a rocking support at 58 on brackets 581 secured to the base plate 1 (cf. Fig. 11). The levers 57 are suspended at their front ends by means of links 56 from both of the two shift key levers 54. The shift key levers 54 carrying the shift keys 50 and 51 are mounted on brackets 55 rising from the base plate 1, and the brackets for the two levers are so severally placed that the two levers differ in length of work arm, and consequently in the range of swing of the work arm, in response to key depression. Thus, as one or the other of the two keys 50 and 51 is depressed, the links 56 and the mechanism connected therewith are shifted through a wider or narrower range. When the key 50 is depressed, the fifth row of the type cylinder is brought to printing position, and when the key 51 is depressed, the third row of type is brought to printing position. It will be perceived that the engagement of the links 56 with the levers 57 is a pin-and-slot engagement; this permits either of the two shift keys 50 and 51 to function in the manner described without hindrance by the companion key which at the time is not functioning.

(2) *Axial shifting of the type cylinder on depression of the type keys.*

In addition means are provided for further lifting the type cylinder a distance corresponding to the distance between the first and second, between the third and fourth, or between the fifth and sixth rows of type. This operation is automatically performed when certain of the type keys are depressed, but not when others are depressed. Thus, when the first, the third, or the fifth row of types is in printing position, if the type key struck be a key whose corresponding type lies in the first, third, or fifth row, there will be no axial shifting, but if the type key struck be a key whose corresponding type lies in the second, fourth, or sixth row, the type cylinder will, in consequence of the depression of the key, be shifted axially before the type strikes the paper. It will be perceived as the description proceeds that the slotting of the links 56, of which mention has already been made, permits the supplementary axial shifting last mentioned of the type cylinder.

The additional lifting movement of the type cylinder is derived from the armature 65 of an electromagnet 64 the core of which is secured to brackets 641 rising from the base plate 1. The said armature is secured to arms 116 and 117 of a frame consisting of the said arms and spacing rods 66, 651, 652 and 653. At its ends the rod 66 carries trunnions 661 rockingly mounted in the pillars 21 and 22. To the rod 652 two arms 654 are secured to which a ram 67 is jointed. As shown the screw threaded top end of the ram is passed through a bore made in a pivot block 68 and adjustably secured thereto by nuts 69 and 70. At its bottom end the ram is jointed at 73 to a link 71, which in turn at its opposite end is jointed to an eye 83 secured to a transverse bar 84 adapted to be rocked forwardly and backwardly in the manner to be described hereafter. By rocking the bar 84 the bottom end of the ram 67 is adapted to be brought into position for engagement with a nose 74 formed on a rocker 75 mounted at 76 in a slot of the base plate 1. The rocker 75 carries two arms 751 providing a cam slot 77 adapted for cooperation with either one of three pins 78, 79 or 80 secured to the levers 57. The arrangement is such that the slot will engage one or the other of the three pins, according as the printing cylinder is standing in one or the other of its three positions already described, with the first, the third, or the fifth row of type in printing position. (See Fig. 12). The pins 78, 79 and 80 are so disposed on the lever 57 that the pin 80 is in operative position relatively to the cam slot 77 when neither of the shift key levers has been depressed, while one or the other of the pins 79 or 80 is in operative positions when one or the other of the shift keys 50 or 51 has been depressed. Normally the rocker 75 is retracted away from the pins 78, 79 and 80 by a spring 81, and the rocking movement of the rocker is limited by a stop member 82 adapted for engagement with the right hand face of the rocker (Fig. 9) or with an arm 752 thereof (Fig. 12). Preferably the stop member 82 is in the form of a spring secured to the base plate, in order to reduce the noise caused by the rocker striking against the stop member.

For setting the ram 67 into and out of operative positions relatively to the rocker 75 the following mechanism is provided. The bar 84 and a similar bar 85 located above the same are suspended, in such manner as to swing independently each of the other by means of arms 841 and 851, from pivot bolts 86 provided on arms 861 secured to and projecting forwardly from the transverse bar 10 rising from the base plate 1, as is shown in Figs. 2, 3, and 18. To the bars 84 and 85 U-shaped arms 87 and 88 respectively are secured the front ends of which are in positions for engagement by rockers 89 or 90 mounted on the rear ends of the type key levers 48 and 49. The key levers 48 and 49 are mounted in pairs, and one key lever of each pair is adapted for acting on an arm 88 secured to the upper bar 85 and the other key lever of each pair is adapted to act on an arm 87 secured to the lower bar 84. Therefore, when depressing a type key either one or the other of the arms 87 or 88 is lifted so as to rock the bar (84 or 85) connected therewith in forward direction. When it is the bar 85 which is so rocked the ram 67 is not swung, but when it is the bar 84 which is so rocked the ram is swung to operative position, for shifting the type cylinder through the intermediary of the rocker 75 in the manner described.

The rockers 89 and 90 are provided each with a lateral tongue 891 or 901 engaging the U-shaped arms 87 and 88 respectively, the tongues 891 of the rockers 89 being directed to the left and the tongues 901 of the rockers 90 to the right. By means of the said tongues the movements of the type key levers are transmitted to the said arms and to the bars 84 and 85.

The bars 84 and 85 are provided with means for opening and closing the circuit of the electromagnet 64, for which purpose they carry arms 91 and 92 respectively the rear ends of which are in loose engagement with an insulating roll 93 provided on an arm 94 carrying a contact making spring 941 and mounted on a bracket 942 rising from an insulating block 943 secured to the base plate 1, as is shown in Figs. 2 and 18. The spring 941 cooperates with a contact screw 96 secured to a bracket 961 rising from an insulating block 962 secured to the base plate 1. A spring 944 tends to retract the contact spring 941 away from the contact screw 96. It will therefore be understood that when depressing either one of the type keys the electromagnet 64 will be energized for attracting the armature 65, and that such movement of the armature is transmitted to the rocker 75 only if the depressed key corresponds to the bar 84. Consideration of Figs. 9 and 12 will make plain the operation of the ram 67. It is first drawn from right to left, and then caused to descend vertically. In this operation the rocker 75 is first swung clockwise against spring tension to bring the slot 77 into engagement with one or another of the pins 78, 79, 80, and then through such engagement the lever 57 is, in the further descent of the ram, swung clockwise to effect the shifting of the type cylinder through the interval at which the two rows of each set of type stand apart. I remark in passing that, as presently will appear, the energizing of magnet 64 and the shifting of its armature 65 accomplish other ends in addition to the driving downward of the ram 67.

(3) *Rotation of the type cylinder.*

For bringing any one of the types of each row to printing position the type cylinder is adapted to be rotated by the following mechanism: The sleeve 62 carries a spur gearing 97 which is in engagement with a toothed sector 98 connected by a block 981 with an arm 99. The sector and arm are secured at their rear ends to a vertical spindle 982 rockingly mounted at its ends in transverse rails 983 secured through the intermediary of spacing sleeves 984 to the plate 148. The slotted front end of the arm 99 is engaged by the reduced top end 1001 of an arm 100 rising from the front end of an arm 101 secured to a vertical rock shaft 102 mounted in a step bearing 1021 secured to the base plate 1, and in a bore of an arm 1022 secured to the bar 10, as is best shown in Fig. 12. At its rear end the arm 101 is provided with a slot engaged by a roller 103 which is borne on a pivot bolt made integral with a U-shaped member 104 secured to a transverse rack 105, as is shown in Figs. 1–4, 12 and 13. This rack is suspended by means of links 106 and 107 from uprights 1061 and is guided between rollers 108, 109, 110 and 111 mounted on pins 1081 secured to the bar 10. By the shifting of the rack 105 to the right or left the type cylinder is turned to the left or right. The extent of rotation of the type cylinder in any given case is determined by means of the spaces 105′ between the teeth of the rack which are adapted to be engaged by levers 112 lifted upon depression of a type key. The levers 112 are mounted on pivot bolts 113 fitted in eyes 1131, and they are normally held out of engagement with the said spaces of the rack 105 by springs 114 placed between the front ends of the levers 112 and the bases of the eyes 1131. The eyes 1131 are mounted on a transverse rail 1132 secured to pillars 1133 rising from the base plate 1, as is best shown in Figs. 16 and 17. To the levers 112 transverse pins 115 are secured, and the pins of each lever extend over two of the rockers 89, 90. Therefore each lever 112 is adapted to be lifted by two adjacent type key levers. The type key levers acting on the same lever 112 correspond to types disposed on the type cylinder one above the other. The rear ends of the levers 112 are guided in slots 1121 of the bar 10 (see Fig. 17). The levers 112, it will be observed, are rotation-controlling levers, in that the swinging of one of these levers to rack-engaging position is determinative of the range of rotation of the carrier.

For moving the rack 105 the following mechanism is provided. Between the arms 116, 117 of the frame carrying the armature 65 of the electromagnet 64 a bail is rockingly mounted which consists of angular members 120, 121 having trunnions 118 and 119 secured thereto and a bar 122, as is shown in Figs. 1, 2, and 7. From an arm 1241 secured to the bar 122 a bell crank lever having three arms 123 in pivotally suspended at 124 (Figs. 3, 4 and 7). The horizontal arms 123 carry rollers 125 and 126 respectively, and the downwardly directed arm is formed with a slot 127 which is engaged by a grooved roller 128 the shaft of which is secured to the U-shaped member 104 secured to the rack 105. The rollers 125 and 126 bear on the horizontal arms of bell crank levers 130 and 131 mounted on pins 129 and 129′ of a bracket 1291 which is secured to the bar 10. To the downwardly directed arms of the bell crank levers 130, 131 the inner ends of small racks 134 and 135 are jointed. The outer ends of these small racks are suspended by means of links 132 and 133 from the uprights 1061. Normally the racks 134 and 135 are held in retracted position by coiled springs 136 and 137 connected to the downwardly directed arms of the bell crank levers 130 and 131 and to pins 1361 secured to the bar 10. The gaps 134′ and 135′ of the small racks are located above the levers 112, and the small racks 134 and 135 are located immediately at the rear of the rack 105, but while the rack 105 extends over all the levers 112, the small racks cooperate respectively with the right and left hand groups of the said levers. If now a type key is struck,—for example one of the left hand group—, the lever 112 controlled thereby is lifted into the spaces of the racks 105 and 134 which corresponds thereto. Furthermore, by the swinging of any type key lever the contact 95, 96 of the electromagnet 64 is closed, the armature 65 attracted, and the bell crank lever 123 carried bodily downwardly with the frame 122 to which it is pivoted. The bell crank levers 130, 131 then are rocked about their pivots and the racks 134, 135 are moved inwardly. The rack 134, the bell crank lever 130 and the roller 125, after moving through a distance corresponding to the breadth of the particular space 134′, are arrested against further movement by abutment of a tooth of the rack upon the previously elevated lever 112. The frame 122, continuing its downward movement, continues to carry downward the pivot bolt 124. In consequence, the bell crank lever 123 is rocked about its pivot bolt 124 and as it is rocked, it shifts the rack 105. This shifting of the rack 105 effects rotation of the type cylinder 53 to the right. Meanwhile, at the right hand side of the machine the bell crank lever 131 and the rack 135 are not arrested in their inward idle movement. It will be perceived on considering particularly Figs. 3, 4, 5, and 6 of the drawings, that the spaces between the teeth of the long rack 105 are arranged in two series of graduated width, increasing in width from the middle of the machine outwardly, and further it will be perceived that the spaces between the teeth of the small racks 134 and 135 are of gradually diminishing width from the inner ends of these two racks outwardly. It will further be perceived that the two sets of spaces correspond in number and in relative position when the racks are assembled. The interval of swing of armature 65 and the consequent interval through which the beam 122 is carried downward, is always the same. Proportionately, therefore, as the space 134' (135') in one of the small racks into which one of the levers 112 has risen is wide or narrow, the beam 122 will move through a wider or narrower downward range before the small rack abuts upon the lever 112. The further descent of the member 122 will correspondingly be shorter or longer, and so the degree through which the type cylinder is rotating will be shorter or longer. If in one case the movement of one of the racks is equal to 1 and that of the other one equal to 6, then in another case in which one of the racks is moved through a distance equal to 2 the other one is moved through a distance equal to 5, etc. When depressing a key of the right hand side of the key board, the rack 135 is arrested while the rack 134 has an unstopped movement, and the type cylinder is turned to the left; when depressing a key of the left-hand side of the keyboard, it is the rack 134 which functions, while the rack 135 meets no obstruction, and in this case the type cylinder is turned to the right. Small inaccuracies are compensated by known means, such for example as a spur gear 138 (Figs. 1, 9, and 10) secured to the sleeve 62 and engaged when printing by a blade 139 (Fig. 1) secured to a relatively fixed part. When the circuit including the electromagnet 64 is broken, the springs 136 and 137 return the bell crank levers 130 and 131, the racks 134 and 135, the bell crank lever 123, the rack 105, the type cylinder 53 and the armature 65 into initial positions, which initial positions are insured by the horizontal arms of the lever 123 making contact with stop arms 140 and 141 secured to arms 1292 of the member 1291. As shown the arms 140 and 141 are in the form of springs in order to reduce the noise. In addition the vertical arm of the lever 123 carries a blade 142 engaging in a notch 1421 of a bridge 143 secured to the member 1291 (see Fig. 8).

(4) *Swinging of type cylinder.*

For throwing the type cylinder against the platen the following mechanism is provided:

To the base plate 1 an electromagnet 155 is secured the armature 153 of which is carried by an arm 1532 of a bell crank lever mounted on a rock shaft 1531 disposed in brackets 1533 depending from the base plate 1. The other arm 152 of the said bell crank lever is connected by the link 151 with the eyes 150 secured to the plate 148, as has been described above. The electromagnets 64 and 155 are connected in shunt and the circuit make and break device 91 to 96 controls both electromagnets. But the circuit of the electromagnet 155 includes a second circuit make and break device consisting of a contact 160 and a contact spring 159 (Figs. 1 and 2) both mounted on and insulated from the base plate 1, and an arm 156 secured to the rock shaft 66 and carrying a screw 158 having an insulated head 157 adapted for engagement with the spring 159 for throwing the same into circuit closing engagement with the fixed contact 160.

The shaft 61 of the type cylinder is supported at its bottom end on the spherical head 591 of the rod 59, and as shown the said head is formed on a stem 592 adjustably secured to the rod 59 (Figs. 9–12, 14, and 15). The stem 611 forming the adjustable bottom part of the spindle 61 is embraced by a collar 163 to which a bail 161 is articulated at 162. The bottom end of the bail is jointed at 164 to the bottom part of the rod 59. As is best shown in Figs. 14 and 15 the collar 163 has ample clearance on the stem 611 to permit free vertical movement of the spindle 61, as is indicated at 165. Thereby the friction of the stem 611 within the collar 163 is reduced. When the type cylinder is thrown against the platen the bail 161 is firmly pressed on the top face of the enlarged portion 612, as is shown in Fig. 15, because the bail and the rod 59 rock about different axes (164 and 60 respectively). Thereby at the end of the throwing movement the spindle 61 of the type cylinder is held in the exact position.

To the plate 148 a rod 166 is jointed at 167 (Fig. 1) which has an adjustable head 168 screwed into an axial bore provided at its top end, which head is adapted to engage a bar 1661 secured to the machine frame for limiting the return movement of the type cylinder after printing. The bottom end of the rod 166 is jointed to an arm 169 of a bail 171 extending over the whole breadth of the machine and having a rocking support at 170. When after printing, the plate 148 moves downwardly the rod 166 rocks the bail 171 rearwardly and against a horizontal arm 172 of the rocker 89 or 90 which had been lifted by the depression of a type key together with the type key lever 48 or 49 carrying the same, so that the arm 172 is now in position for engagement by the bail 171. The rocker 89 or 90 is rocked rearwardly, the arm 87 or 88 and the setting lever 112 drop into initial positions, the contact 95, 96 is opened, and the armatures of the electromagnets and the parts connected therewith return into initial positions. It will be understood that all the said return movements are performed even if the depressed key lever is not released.

By providing two contact make and break devices in the circuit of the throwing electromagnet 155 one of which is closed together with the circuit make and break device 94, 96 of the electromagnet 64 and the other one by the operation of the armature 65, the circuit of the throwing electromagnet is completed after that of the electromagnet 64. The de-energizing of both of the two magnets is simultaneous.

Provision is made for regulating the power of the throwing operation. If many copies are required a high throwing power is transmitted to the type cylinders, and the power is reduced if only one or a few copies are to be printed. As shown in Figs. 1 and 2 a screw 173 screwing in bores made in the frame members 29, 30 and passed through the front wall of the machine bears on a spring 174 secured to the member 30 and having a part of its length bent at an angle of 45 degrees, which part is in the path of an arm 175 secured to the plate 148 and having a bent end portion. Upon the printing movement of the type cylinder and of the plate 148, the said bent portion of the arm 175 strikes against the bent part of the spring 174. Proportionately as the spring 174 is adjusted inwardly by means of the screw 173, the force of impact of the type cylinder 53 upon the paper is diminished. The screw 173 carries a hand 176 moving over a disk 177 showing the words "strong" and "weak" and graduation marks. Preferably the spring 174 is provided with a lining of felt or leather.

(5) *Paper carriage.*

The paper carriage comprises a bottom part or frame and a top part removably mounted thereon. The bottom part or frame consists of rails 199 and 200 and side members 201 and 202, and it is slidable between the rails 11 and 12 (Figs. 1, 23, and 24). The top part consists of a pair of side members 203 and 204 rising from a base plate 201 and provided at their bottoms with conical pins, one of which, 205, appears in Fig. 24. These conical pins, protruding downwardly from the upper part of the paper carriage, enter (when the upper part of the carriage is applied) the notches 2011 and 2021 of the bottom part of the paper carriage. At the bottom sides of the members 201 and 202 bell crank levers 207 and 208 are mounted which are normally pressed by leaf springs 209 and 210 into locking engagement with the notches of the said pins. By reason of the conical form of the pins 205 and 206 the bell crank levers 207 and 208 are pressed to the side when placing the top part of the carriage on the frame with the pins 205 and 206 passing through the notches 2011 and 2021. From the bell crank levers 207 and 208 finger pieces 213 and 214 extend downwardly (Fig. 24) by means of which the levers can be withdrawn out of locking engagement with the pins 205 and 206, whereupon the top part of the carriage can be removed from the frame 199, 200, 201 202. The top part of the carriage carries the platen 500.

(6) *Carriage movement.*

The carriage is moved for letter spacing by the following mechanism: On the top plate 2 of the frame of the machine and at the rear thereof a bail consisting of a rail 194 of square cross-section and arms 1941 is rockingly mounted in eyes 192 and 193 secured to the bottom side of the plate 2 (Figs. 23 and 24). On the rail 194 a slide 195 is movable, and upon the slide a pawl 196 is pivoted at 215. One arm of the pawl carries a pin 216 engaging in a slot made in a plate 217 secured to the rail 200 of the paper carriage. The other arm of the pawl is normally in engagement with the lower one of a pair of racks 218 and 219. The upper rack 219 is secured to a rocking frame consisting of a transverse bar 223 rockingly mounted in eyes 224 and 225 secured to the plate 2, and arms 220, 221 and 222. The lower rack 218 is carried by the upper rack 219 and it is longitudinally slidable thereon a distance corresponding to the letter space. As shown a pair of screws 2181, passing through the slots 2182 formed in the upper rack are screwed into the lower rack. A spring (not shown) tends to pull the lower rack to the right. The heads of the screws 2181 are acted upon by springs 227 reducing the noise connected with the operation of the racks. The arm 221 is connected by a link 226 with a frame consisting of a transverse bar 231 and arms 229 and 230 rockingly mounted on the trunnions 232 and 233 of the frame 66, 116, 117 (cf. Fig. 2.) The bar is disposed below the said frame 66, 116, 117. The link 226 is jointed to eyes 228 secured to the bar 231. When the armature 65 is attracted by the electromagnet 64 the bail 229, 230, 231 and the link 226 are carried along, so that the pawl 196 temporarily releases the lower rack 218 and engages the upper rack. Thereupon the lower rack is pulled by its spring to the right. If thereafter the armature 65 is released the racks 218 and 219 are lifted by a spring 2211 (Fig. 1), so that the pawl 196 comes again into engagement with the lower rack, which is shifted by the carriage spring to the left together with the paper carriage.

The carriage may also be moved by the space keys 47 (see Fig. 25). The key levers 235 of the space keys are rockingly mounted at 234, and they are in pin and slot engagement with intermediate levers 237 mounted at 236 and connected by links 238 having heads 239 to ears 240 and 241 secured to the arms 229 and 230 (cf. Figs. 2, 25).

When shifting the paper carriage to the right the pawl 196 releases the rack 218 so that the return movement of the carriage is practically noiseless. If thereafter the operator releases the carriage the pawl 196 is immediately thrown into engagement with the rack 218, because the resistance of the pawl as against rocking movement is smaller than the resistance of the slide 195 as against sliding on the rail 194.

(7) *Tabulation keys.*

The tabulation keys 46<sup>t</sup> are carried by levers 178 disposed with their inner or rear ends in positions for engagement with vertical bars 179 (Fig. 1). Said bars are acted upon by leaf springs 184 tending to force the same downwardly and away from tabulation stops 180 placed on a rack 181 of the paper carriage. The bars 179 are adapted to rock a frame 185 mounted at 186, 187 and acting on a lever 189 mounted at 188 (Figs. 1, 23 and 24). The free end 189' of the said lever is disposed above a head 191 adjustably mounted on an arm 190 secured to one of the arms of the rail 194. When depressing one of the tabulation keys the bar 179 controlled thereby is lifted into position for engagement with the tabulation stop 180 for arresting the paper carriage, and the rail 194 and the pawl 196 are retracted away from the racks 218, 219 so as to release the carriage, which is now pulled to the right. For reducing the impact of the carriage striking against the tabulation stop 180 a brake shoe 197 is provided which is forced by an arm 198 secured to the frame 185 against the bottom side of the rail 199 of the carriage.

(8) *Mounting of type cylinder.*

The type cylinder 53 is mounted on the spindle 61 as follows: To the spindle a cup 372 is secured by means of a pointed screw 373, and to the cup a tubular member 374 of square cross-section is secured (Fig. 26). Within the top part of the tubular member two springs 376 are provided which are formed at their top ends with noses 376'. The springs are fixed in position by means of a pin 377 and a spacing ring 378. To the top face of the type cylinder 53 a disk 379 provided with a handle 380, 381 is secured (cf. Figs. 27, 28). Within the cup 372 there is a coiled spring 375 engaging the top part of the type cylinder and tending to force the same away from the cup 372, the cylinder being normally held in position by the noses 376' of the springs 376. On pressing the springs 376 together by means of the thumb and forefinger the type cylinder, previously in place, will be thrown by spring 375 upwardly and with the handle 380, 381 between the fingers, whereupon the operator may remove the type cylinder without soiling his fingers. Preferably a pin 382 is provided between the springs 376 to make sure that both springs are compressed.

For mounting the cylinder I place the same on the top ends of the springs 376 which are bent inwardly when pushing the cylinder downwardly. To the inner side of the cylinder a pin 383 is secured which is adapted for engagement with the beveled side faces 372' of a cut-out portion made in the wall of the cup 372, for guiding the type cylinder into correct position (cf. Fig. 29).

(9) *Mounting of platen.*

In Fig. 30 I have shown the method of mounting the platen 500 on the side members 203 and 204 of the paper carriage. The platen is fitted on a tubular core 501 closed at both ends by disks 502 and 503. To the disk 503 an axial pin 524 and a pair of diametrically opposite pins 517 and 518 are secured which are in loose engagement with corresponding bores made in a flange 516 of a spindle 525. The said spindle is mounted in a bushing 520 fitted in a bore of the member 204, and within an annular chamber provided by the bushing and the spindle there is a coiled spring 519 tending to force the platen to the left. The right hand end 526 of the spindle 525 is square in cross-section and it carries a disk 527 provided with a pair of pins 523 engaging in bores of a button 521. The button is fixed in position by a screw 522 screwing in a socket of the spindle 525. The disk 502 is rotatably mounted on the reduced end of a spindle 528 fixed to the side member 203. The platen may be rotated by hand by means of the button 521. By retracting the button in opposition to the spring 519 the flange 516 is disengaged from the disk 503 and the pins 517, 518 and 524, whereupon the platen may be removed.

The spindle 528 is made integral with a flange 532 fixed to the side member 203 by means of screws 533. On the spindle 528 a gear wheel 506 connected with the line spacing mechanism is rotatable, and a flange of the said wheel is formed with a conical inner wall adapted for engagement with a conical lining 515 of a clutch member 505 rotatable on the axis 528. A bore of the said clutch member is loosely engaged by a pin 504 secured to the disk 502. The members 506 and 505 are held in position by means of collars 531 and 509 respectively, a spring 529 being interposed between the collar 531 and the wheel 506 tending to force the same to the right and into coupling engagement with the member 505. In an axial bore of the spindle 528 a screw 534 is axially shiftable the cylindrical end 507 of which is equipped with a transverse pin 508 passing through slots of the spindle 528. The screw is engaged by a nut 510 adapted when turned to retract the screw 534, the pin 508 and the wheel 506 to the left and away from the member 505, so that the platen may be turned independently of the line spacing mechanism by means of the button 521. For turning the nut 510 a spindle 513 is rotatably mounted in a bore of the member 203, which spindle carries a handle 512 and a spur gear 511 in mesh with teeth provided on a flange of the spindle 510.

While in describing the invention reference has been made to a particular example embodying the same I wish it to be understood that my invention is not limited to the construction shown in the drawings, and that various changes may be made in the general arrangement of the apparatus and the construction of its parts without departing from the invention.

I claim:

1. In a typewriting machine, the combination, with a platen, and a rotary and axially movable type carrier having a plurality of axially spaced rows of circumferentially arranged types, of power operated means and hand operated means having additive action for axially moving the type carrier to position, with either one of the rows of types in printing position, means for rotating the type carrier to position, with any one of the types of each row in printing position, and means for throwing the type carrier against the platen.

2. In a typewriting machine, the combination, with a platen, and a rotary and axially movable type carrier having a plurality of axially spaced pairs of rows of circumferentially arranged types, of hand operated means for axially shifting the type carrier a distance corresponding to the distance of corresponding rows of the pairs, power operated means for axially shifting the type carrier a distance equal to the distance between rows within pair, means for rotating the type carrier into position with any one of the types of a row in printing position, and means for throwing the type carrier against the platen.

3. In a typewriting machine, the combination, with a platen, a rotary and axially movable type carrier having a plurality of axially spaced rows of circumferentially arranged types, and type key levers, one for each type, of power operated means controlled by a part of said type key levers for axially moving the type carrier a distance corresponding to the distance between rows, means controlled by said type key levers for rotating the type carrier to position, with any one of the types within a row in printing position, and means for throwing the type carrier against the platen.

4. In a typewriting machine, the combination, with a platen, and a rotary and axially movable type carrier having a plurality of axially spaced pairs of rows of circumferentially arranged types, of hand operated means for axially shifting the type carrier a distance corresponding to the distance between the pairs of rows, a power operated cam member adapted for cooperating with the type carrier in any of its positions for imparting additional shifting movement thereto in axial direction a distance equal to the distance of between the rows within a pair, means for rotating the type carrier into position, with any one of the types of a row in printing position, and means for throwing the type carrier against the platen.

5. In a typewriting machine, the combination, with a platen, of a type carrier having the types disposed thereon in a plurality of circumferential rows, a rocking lever on which said type carrier is supported, shifting means in pin and slot engagement with said rocking lever for axially shifting said type carrier, a cam member operative in any position of said rocking lever for imparting additional shifting movement to said lever, type key levers adapted to rotate said type carrier to position, with any of the types of its rows in printing position, means controlled by a part of the type key levers for operating said cam member, and means for throwing the type carrier against the platen.

6. In a typewriting machine, the combination, with a platen, a rotary and axially movable type carrier having a plurality of axially spaced rows of circumferentially arranged types, and type key levers one for each type, of means controlled by a part only of said type key levers for axially moving the type carrier a distance corresponding to the distance between rows, means controlled by said type key levers for rotating the type carrier to position, with either one of the types of each row in printing position, and means for throwing the type carrier against the platen.

7. In a typewriting machine, the combination, with the platen, of a type carrier having the types disposed thereon in a plurality of circumferential rows, an electromagnet and its armature, means connected with said armature for rotating the type carrier into position, with any one of the types within a row in printing position, the means last named including a series of swinging levers, mechanism for axially shifting the type carrier from one operative position to another, a normally inoperative member intermediate said armature and shifting mechanism for operating the shifting mechanism, separate means for swinging each of said levers, means controlled by a part of said lever-swinging means for moving said normally inoperative member into operative position, and means for throwing the type carrier against the platen.

8. In a typewriting machine, the combination, with a platen, of a type carrier having the types disposed thereon in a plurality of circumferential rows, a rocking lever on which said type carrier is supported, shifting means in pin and slot engagement with said rocking lever for axially shifting said type carrier, a cam member operative in any position to which the said rocking lever has been shifted by said shifting means for imparting additional shifting movement to said lever, an electromagnet and its armature, an operative connection between said armature and type carrier for imparting rotary movement thereto, a normally inoperative member intermediate said armature and cam member for operating the cam member, type key levers adapted to cause energization of said electromagnet, means controlled by the type key levers for limiting the rotary movement of the type carrier, means controlled by a part of said type key levers for setting said normally inoperative member into operative position, and means for throwing the type carrier against the platen.

9. In a typewriting machine the combination, with a platen and a rotary and laterally movable carrier equipped with a circumferentially arranged succession of types, of a plurality of type key levers arranged in spaced succession, means for rotating the type carrier in response to the shifting of any of the said type key levers, such carrier-rotating means including a plurality of rotation-controlling levers arranged in spaced succession, and adapted to be swung severally by said type-key levers, and means for throwing the carrier laterally against the platen.

10. In a typewriting machine the combination, with a platen and a rotary and laterally movable carrier having two rows of circumferentially arranged types, of a plurality of type key levers arranged in spaced succession, means for rotating the type carrier in response to the shifting of any of the said type key levers, such carrier-rotating means including a plurality of rotation-controlling levers, each adapted to be swung by either of two of said type key levers, and means for throwing the carrier laterally against the platen.

11. In a typewriting machine, the combination, with a platen, and a type carrier having a plurality of rows of circumferentially arranged types, of type key levers, rockers mounted on said levers, means controlled by said rockers for axially shifting said type carrier from one operative position to another, means controlled by said rockers for rotating the type carrier through a limited range, means for throwing the type carrier against the platen, and means for returning the type carrier into initial position.

12. In a typewriting machine, the combination, with a platen, and a type carrier having a plurality of rows of circumferentially arranged types, of type key levers, rockers mounted on said levers, means controlled by said rockers for axially shifting said type carrier from one operative position to another, means controlled by said rockers for rotating the type carrier into position, with any one of the types in printing position, means for throwing the type carrier against the platen, and means for returning the type carrier into initial position.

13. In a typewriting machine, the combination, with a platen, of a type carrier having the types disposed thereon in a plurality of circumferential rows, shifting means for axially moving the type carrier, means for rotating the type carrier to position, with any one of the types within a row in printing position, an electromagnet and its armature operatively connected with said rotating means, two sets of type setting mechanisms, a pair of shiftable bars adapted to be shifted each by the type setting mechanisms of one of the said sets, means controlled by each of said bars for energizing said electromagnet, means controlled by one of said bars for connecting said armature with said shifting means, and means to throw said type carrier against the platen.

14. In a typewriting machine, the combination, with a platen, of a rockable carrier having the types disposed thereon, the spindle of the type carrier provided with an enlarged portion, a rockable stem on which said spindle is rockable, a collar axially shiftable on said spindle and near said enlarged portion, a member pivoted both to said collar and said stem and adapted as spindle and stem rock, to pull said collar into locking engagement with the enlarged portion of said spindle, means for rocking the type carrier towards the platen, and means for setting the type carrier with any one of its types in printing positions.

15. In a typewriting machine, the combination, with a platen, of a type carrier provided with circumferentially arranged types, type keys, means controlled by said type keys for imparting rotary movement to said carrier for setting the same with either one of the types in printing position, said means comprising a longitudinally shiftable rack connected with the type carrier for rotating the same and provided with teeth, and levers controlled by said type keys and adapted to be shifted thereby into positions for engagement with said teeth, the spaces between the teeth being of varying width corresponding to the relative positions of the types on the carrier, and means for throwing the type carrier against the platen.

16. In a typewriting machine the combination with a platen, of a cylindrical type carrier provided with circumferentially-arranged types and rotatable on its axis in either direction from a neutral point to bring individual types successively to printing position, means for rotating said type carrier, such rotating means including a driving member and a pair of driven members adapted to be moved in opposite directions by the movement of said driving member, a series of manually shiftable bars each of said bars adapted when shifted to operative position to serve in cooperation with one or the other of said driven members in transmitting movement of the driving member first named to the type carrier, effecting rotation of the type carrier in one direction or the other.

17. In a typewriting machine, the combination, with a platen, of a type carrier provided with circumferentially arranged types, type keys, means controlled by said type keys for imparting rotary movement to said carrier for setting the same with either one of the types in printing position, said means comprising a longitudinally shiftable rack connected with the type carrier for rotating the same and provided with teeth, a rockingly mounted bail adapted to be moved by means controlled by the type keys, a bell crank lever pivoted in said bail, a second bell crank lever pivoted to a fixed support and adapted to be rocked by the first, a second rack connected with said second bell crank lever and provided with teeth, one arm of the bell crank lever first mentioned being connected with the rack first mentioned for longitudinally shifting the same, and another one loosely engaging the second bell chank lever for swinging the same, and levers controlled by said type keys and adapted to be shifted thereby into positions for engagement with corresponding teeth of the two said racks, the teeth with which the second-named racks are provided being spaced apart at intervals of varying width, corresponding to the relative positions of the types on the carrier, and means for throwing the type carrier against the platen.

18. In a typewriting machine, the combination, with a platen, of a type carrier provided with circumferentially arranged types, type keys, means controlled by said type keys for imparting rotary movement to said carrier for setting the same with either one of the types in printing position, said means comprising a longitudinally shiftable rack connected with the type carrier for rotating the same and provided with teeth, a rockingly mounted bail adapted to be moved by means controlled by the type keys, a bell crank lever pivoted in said bail, a pair of bell crank levers pivoted to a fixed support and adapted to be rocked by the bell crank lever first named and when moving in opposite directions, a pair of longitudinally shiftable racks jointed one to each of the two bell crank levers second named, said racks also being provided with teeth corresponding in position to the teeth of the first named rack, one arm of the bell crank lever first named being connected with the first named rail for longitudinally shifting the same and two other arms loosely engaging the pair of bell crank levers second named, for rocking the same in opposite directions, and levers controlled by said type keys and adapted to be shifted thereby into positions for engagement with corresponding teeth of the racks, the spaces between the teeth of the second named pair of racks being of varying width, corresponding to the relative positions of the types on the carrier, and means for throwing the type carrier against the platen.

19. In a typewriting machine, the combination, with a platen, of a type carrier provided with circumferentially arranged types, type keys, means controlled by said type keys for imparting rotary movement to said carrier for setting the same with either one of the types in printing position, said means comprising a longitudinally shiftable rack connected with the type carrier for rotating the same and provided with teeth, a rockingly mounted bail adapted to be moved by means controlled by the type keys, a bell crank levers pivoted to said bail, a pair of bell crank levers pivoted to a fixed support and adapted to be rocked by the bell crank lever first named, and when rocked moving in opposite directions, a pair of longitudinally shiftable racks jointed to the two bell crank levers of the second named pair levers and provided with teeth corresponding in position to the teeth of the first rack, one arm of said bell crank lever first named being connected with the first named rack for longitudinally shifting the same and two other arms loosely engaging the second named bell crank levers for rocking the same in opposite directions, and levers controlled by said type keys and adapted to be shifted thereby into positions for engagement with corresponding teeth of said racks, the spaces between the teeth of the second named pair of racks being of varying width, corresponding to the relative positions of the types on the carrier, a relatively fixed member formed with a notch having angular side walls, a lug on the bell crank lever first named in position for engagement with said notch upon the return movement of the lever, and means for throwing the type carrier against the platen.

20. In a typewriting machine, the combination, with a platen, of a type carrier provided with circumferentially arranged types, type keys, means controlled by said type keys for imparting rotary movement to said carrier for setting the same with either one of the types in printing position, said means comprising a longitudinally shiftable rack connected with the type carrier for rotating the same and provided with teeth, a rockingly mounted bail adapted to be moved by means controlled by the type keys, a bell crank lever pivoted to said bail, a pair of bell crank levers pivoted to a fixed support and adapted to be rocked by the bell crank lever first named and when rocked moving in opposite directions, a pair of longitudinally shiftable racks jointed one to each of the second named pair of bell crank levers and provided with teeth corresponding in position to the teeth of the first named rack, one arm of the bell crank lever first named being connected with the first named rack for longitudinally shifting the same and two other arms loosely engaging the pair of bell crank levers second named for rocking the same in opposite directions, and levers controlled by said type keys and adapted to be shifted thereby into positions for engagement with corresponding teeth of the first named rack and one of the racks of the second named pair, the spaces between the teeth of the racks of the second named pair being of varying width, corresponding to the relative positions of the types on the carrier, a pair of relatively fixed stops in position for engagement with the bell crank lever first named, for returning the same into median position, a relatively fixed member formed with a notch having angular side walls, a lug on the bell crank lever first named in position for engagement with said notch upon the return movement of the lever, and means for throwing the type carrier against the platen.

21. In a typewriting machine the combination with a platen, of a cylindrical type carrier adapted to be swung to and from engagement with the platen and adapted also to be rotated on its axis, a set of type keys, means operated by the depression of a type key for swinging the type carrier to engagement with the platen, a toothed rack with a succession of inter-tooth spaces of graduated width, a series of members movable each in response to the depression of one of said type keys, and to position within one of the spaces in said rack, means operated by the depression of a type key and in sequence upon the movement of the member last named for shifting the rack longitudinally, and means operated by the rack in its longitudinal movement for rotating said type carrier.

22. In a typewriting machine the combination with a platen, of a cylindrical type carrier adapted to be swung to and from engagement with the platen and adapted also to be rotated on its axis, a set of type keys, means operated by the depression of a type key for swinging the type carrier to engagement with the platen, a pair of toothed racks arranged in parallelism with inter-tooth spaces of graduated width arranged in opposite pairs, the aggregate width of each pair of opposite spaces being of uniform value, throughout the extent of the parallel racks, a series of members movable each in response to the depression of one of said type keys, and to position within a pair of oppositely arranged spaces in said racks, means operated by the depression of a type key and in sequence upon the movement of the member last named, for shifting the said racks longitudinally and in sequence, and means operated by the last-moving rack for rotating said type carrier.

23. In a typewriting machine, the combination, with a platen, and a type carrier having a plurality of rows of circumferentially arranged types, of a type carrier supporting member, a sleeve rotatable on said member, a spindle of polygonal cross-section carrying said type carrier and non-rotatable and axially shiftable in said sleeve, means for axially shifting the spindle into position with either one of the rows of types of the type carrier in printing position, and means for rocking said type carrier supporting member and throwing the type carrier against the platen.

24. A type carrier for typewriting machines, comprising a spindle, a type carrying member removably mounted on said spindle, means tending to throw said member axially away from the spindle, a pair of springs holding the member on the spindle and formed with adjacent portions in position for engagement by the fingers of an attendant, and a device on said member in position for being gripped by the fingers of the attendant gripping the springs.

25. A type carrier for typewriting machines, comprising a spindle, a cup shaped member secured to said spindle, a type carrying member mounted on said cup shaped member, a spring within said cup shaped member engaging the type carrying member and tending to throw the same away from the type carrying member, and means to lock the type carrying member in position on the cup shaped member.

In testimony whereof I hereunto affix my signature.

OSKAR FISCHER.